(12) United States Patent
Kiest, Jr.

(10) Patent No.: US 8,172,482 B2
(45) Date of Patent: *May 8, 2012

(54) APPARATUS AND METHOD FOR PROVIDING ACCESS TO A BURIED PIPE

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/540,104

(22) Filed: Aug. 12, 2009

(65) Prior Publication Data

US 2011/0038673 A1 Feb. 17, 2011

(51) Int. Cl.
*F16L 55/18* (2006.01)
(52) U.S. Cl. ......................... 405/184.1; 405/156; 138/97
(58) Field of Classification Search .................. 405/156, 405/157, 184.1, 184.3, 184.4; 285/197; 138/97
See application file for complete search history.

(56) References Cited

U.S. PATENT DOCUMENTS

| | | | | |
|---|---|---|---|---|
| 3,649,055 A | * | 3/1972 | Nilsen | 285/197 |
| 4,894,521 A | * | 1/1990 | Evans | 285/197 |
| 4,966,397 A | * | 10/1990 | McKinnon | 285/197 |
| 5,020,832 A | * | 6/1991 | Coblentz | 285/197 |
| 5,360,241 A | * | 11/1994 | Gundy | 285/197 |
| 5,364,207 A | * | 11/1994 | Reber et al. | 405/184.1 |
| 5,462,077 A | * | 10/1995 | Cohen et al. | 405/184.1 |
| 5,601,315 A | * | 2/1997 | Bunger et al. | 285/197 |
| 5,613,807 A | * | 3/1997 | Reber et al. | 405/184.1 |
| 5,624,206 A | * | 4/1997 | Cohen et al. | 405/184.1 |
| 6,017,064 A | * | 1/2000 | Harrington | 285/197 |
| 6,705,801 B1 | | 3/2004 | Kiest, Jr. | |
| 7,699,564 B2 | * | 4/2010 | Shaw | 405/184.1 |
| 2004/0037648 A1 | * | 2/2004 | Kiest, Jr. | 405/184.1 |

FOREIGN PATENT DOCUMENTS

DE 195 29 191 C1 1/1997

* cited by examiner

*Primary Examiner* — Frederic L Lagman
(74) *Attorney, Agent, or Firm* — McKee, Voorhees & Sease, P.L.C.

(57) ABSTRACT

The pipe access device is comprised of a curved plate adapted to engage an underground pipe along an arc of the outer surface of the pipe, and a boss extending upwardly from the curved plate about an aperture in the curved plate. The curved plate extends along an arc of the outer surface of the curved plate that corresponds to a central angle of the pipe less than or equal to 180°. The curved plate includes a concave surface with a radius of curvature less than a radius of curvature of the outer surface of the pipe so as to bias the curved plate against the outer surface of the pipe when the curved plate is flexed to engage the pipe. The pipe access device is for use in providing access to the buried pipe that requires minimal excavation and disruption of the soil.

24 Claims, 5 Drawing Sheets

APPARATUS AND METHOD FOR PROVIDING ACCESS TO A BURIED PIPE

BACKGROUND OF THE INVENTION

The present invention relates to an apparatus and method for providing access to a buried pipe, such as a sewer pipe and the like.

Conventional sewer lines include a main pipe which extends along the street in a direction parallel to the street. Each house has a lateral pipeline that extends from the home and connects to the main pipeline.

It is often desirable to provide a clean-out to the lateral pipe adjacent the main sewer pipe. Many lateral pipes have been buried without such a clean-out. In order to provide a clean-out, it is necessary to make a wide and extensive excavation so that persons can enter the excavation and attach a clean-out pipe to the lateral pipe. This results in considerable disruption to the soil and the yard around the house.

U.S. Pat. No. 6,705,801 to Kiest discloses a saddle and method of using the same for providing access to buried pipe lines which creates a minimum of disruption of the soil. The preferred embodiment disclosed in the patent includes a curved plate that when positioned on the outer surface of the sewer pipe extends beyond the spring line of the pipe. By attaching the saddle to the pipe, a downward force is applied that, in turn, causes the curved plate to spread radially outwardly and then snap back into place to secure the saddle to the outer surface of the pipe. In the preferred embodiment disclosed, the curved plate extends along an arc of the outer surface of the pipe corresponding to a central angle of the pipe more than 180°. The reference also discloses that curved plate spanning an angle of less than 180° may also be used.

However, as the curved plate spans an arc corresponding to a central angle of the pipe less than or equal to 180°, there is no snapping action as described above, as the curved plate does not extend beyond the spring line of the pipe. In addition, if the edges of the curved plate flex outwardly and are held in this position, the boss extending upwardly from the curved plate tends to oblong in shape. This is problematic when attempting to mount a circular extension pipe within the boss and maintaining a fluid tight seal therebetween.

Problems therefore remain when using a saddle having a curved plate that spans an angle of 180° or less around the outer surface of the pipe.

Therefore, a primary object, feature and/or advantage of the present invention is the provision of an improved method for providing access to a buried pipe.

A further object, feature and/or advantage of the present invention is a new apparatus and method for providing access to a buried pipe using a saddle having a curved plate that spans an arc corresponding to an arc angle of 180° or less that can be effectively secured to a substantially circular pipe.

A still further object, feature and/or advantage of the present invention is a new method and apparatus for providing access to a buried pipe using a saddle with a curved plate as described above that does not result in an oval-shaped boss extending upwardly from the curved plate when the curved plate is in a flexed position on the outer surface of the pipe.

These and/or other objects, features and/or advantages of the present invention will become apparent with reference to the remainder of the specification and claims.

BRIEF SUMMARY OF THE INVENTION

One aspect of the present invention includes an apparatus for providing access to an interior bore of a pipe located below a surface of the ground. The apparatus, referred to as a pipe access device, includes a curved plate adapted to engage the pipe along an arc of the outer surface of the pipe, the arc defining a corresponding central angle of the pipe less than or equal to 180°. The apparatus also includes a boss extending upwardly from the curved plate about an aperture in the curved plate. The curved plate includes a concave surface having a radius of curvature less than the radius of curvature of the outer surface of the pipe so that the curved plate is biased against the outer surface of the pipe when the curved plate is expanded or flexed to engage the pipe. Because the curved plate initially has a radius of curvature less than the radius of curvature of the outer surface of the pipe, when the curved plate is flexed and pushed down on top of the pipe, the curved plate provides a pinching or clamping action around the outer surface of the pipe.

In a preferred form, the pipe is a lateral sewer pipe, and the apparatus further includes an extension pipe that extends upwardly from the boss near the surface of the ground. An adhesive material can also be disposed between the curved plate and the outer surface of the pipe to assist in holding the curved plate on the pipe.

Another aspect of the invention includes an apparatus as described above wherein the boss has an oval-shaped cross-section that changes to a substantially circular cross-section when the curve plate is expanded or flexed to engage the pipe. Thus, once the pipe access device is secured to the pipe, a substantially circular extension pipe can easily telescope inside the boss.

Another aspect of the present invention includes a method of providing access to an interior bore of a pipe buried beneath the surface of the ground. The method generally includes excavating the ground to expose a portion of the pipe, taking a pipe access device as described previously, attaching the pipe access device to the pipe, cutting an access hole in the pipe aligned with a boss bore formed by the boss of the pipe access device, and mounting an extension pipe to the boss to provide fluid communication with the surface of the ground. The pipe access device is attached to the pipe by pressing the curved plate downwardly onto the pipe so that the curved plate is biased against the outer surface of the pipe when the curve plate is expanded to engage the pipe. It is preferred that the boss initially have an oval-shaped cross-section that changes to a substantially circular cross-section when the curved plate is expanded or flexed to fit over the pipe.

The present invention contemplates providing access to all kinds of pipelines, including, but not limited to mainline sewer pipelines, lateral sewer pipelines, gas pipelines, and potable water pipelines.

DETAILED DESCRIPTION OF THE PREFERRED EMBODIMENT

For exemplary purposes only, the present invention is described in detail with reference to providing access to a lateral sewer pipe 10. The present invention is equally applicable to both main and lateral sewer pipes 10, 16 as well as other types of buried pipe.

Figure 1:
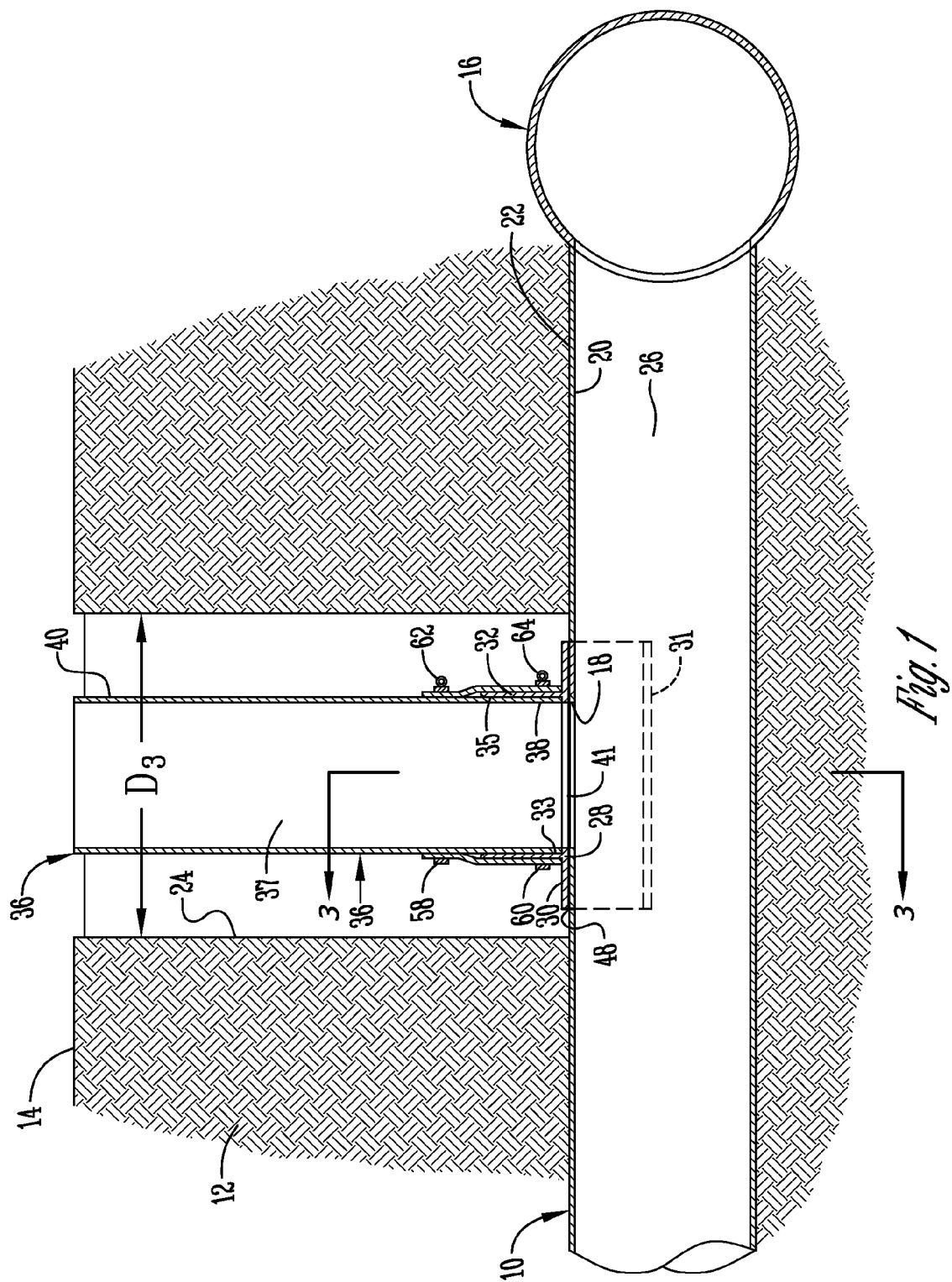
FIG. 1 is a sectional view showing a buried lateral and main sewer pipe and a pipe access device for providing access to the interior of the lateral sewer pipe.

Referring to FIG. 1, a lateral sewer pipe 10 connected to a main sewer pipe 16 is buried beneath the ground 12 having an upper surface 14. An aperture 18 is cut in the lateral pipe 10 and provides access to an interior bore 26 of the pipe 10. Generally this is the last operation performed in providing access to the sewer pipe 10. The sewer pipe 10 includes an inner surface 20 and an outer surface 22 that extend along an arc corresponding to a central angle of 360°.

An excavated hole 24 is dug in the ground 12 from its upper surface 14 to a depth that exposes the sewer pipe 10. The hole 24 has a diameter $D_3$ that provides access from the sewer pipe 10 up to the upper surface 14 of the ground 12, while minimizing disruption to the ground.

Figure 2:
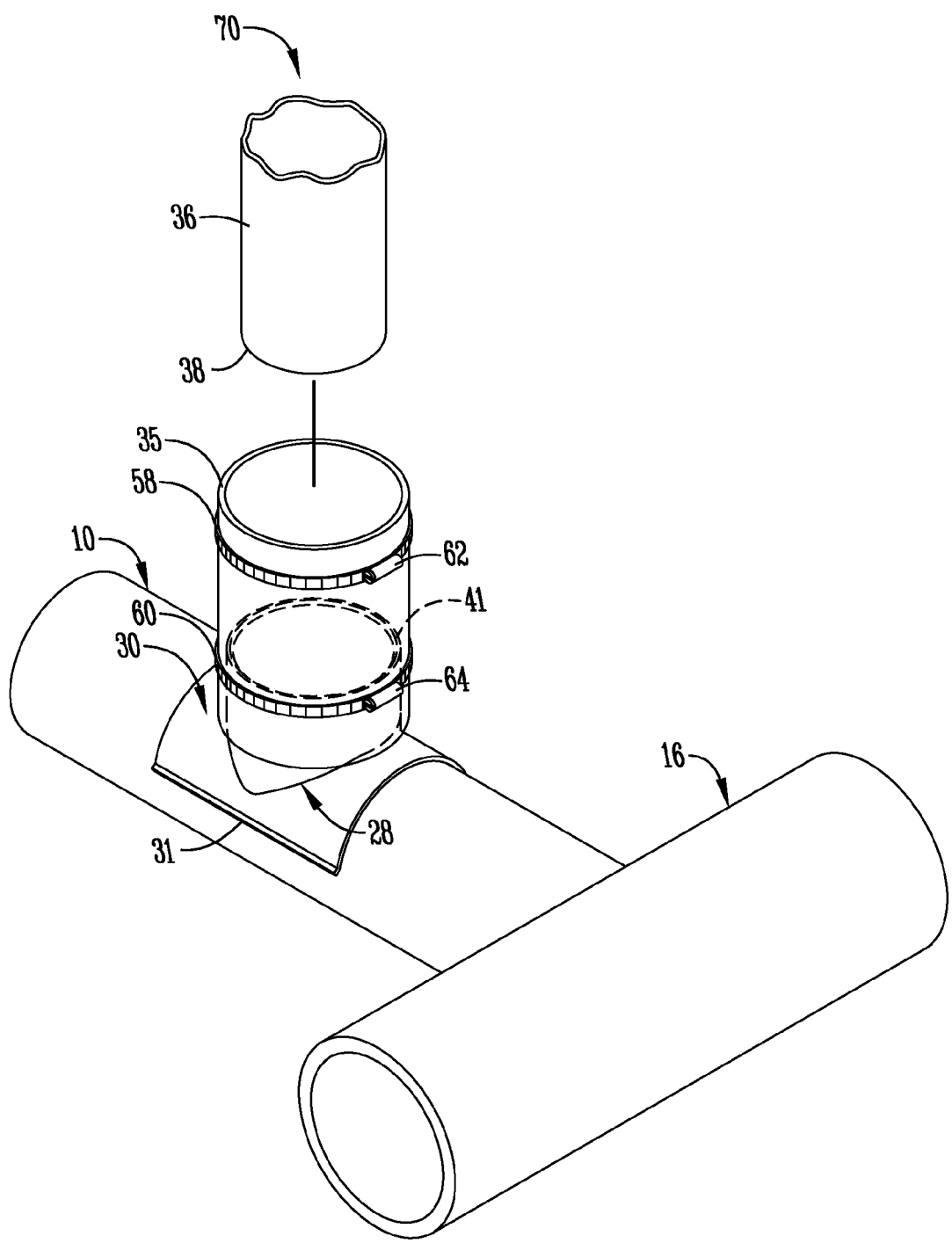
FIG. 2 is a perspective partially exploded view of the device shown in FIG. 1.
Figure 3:
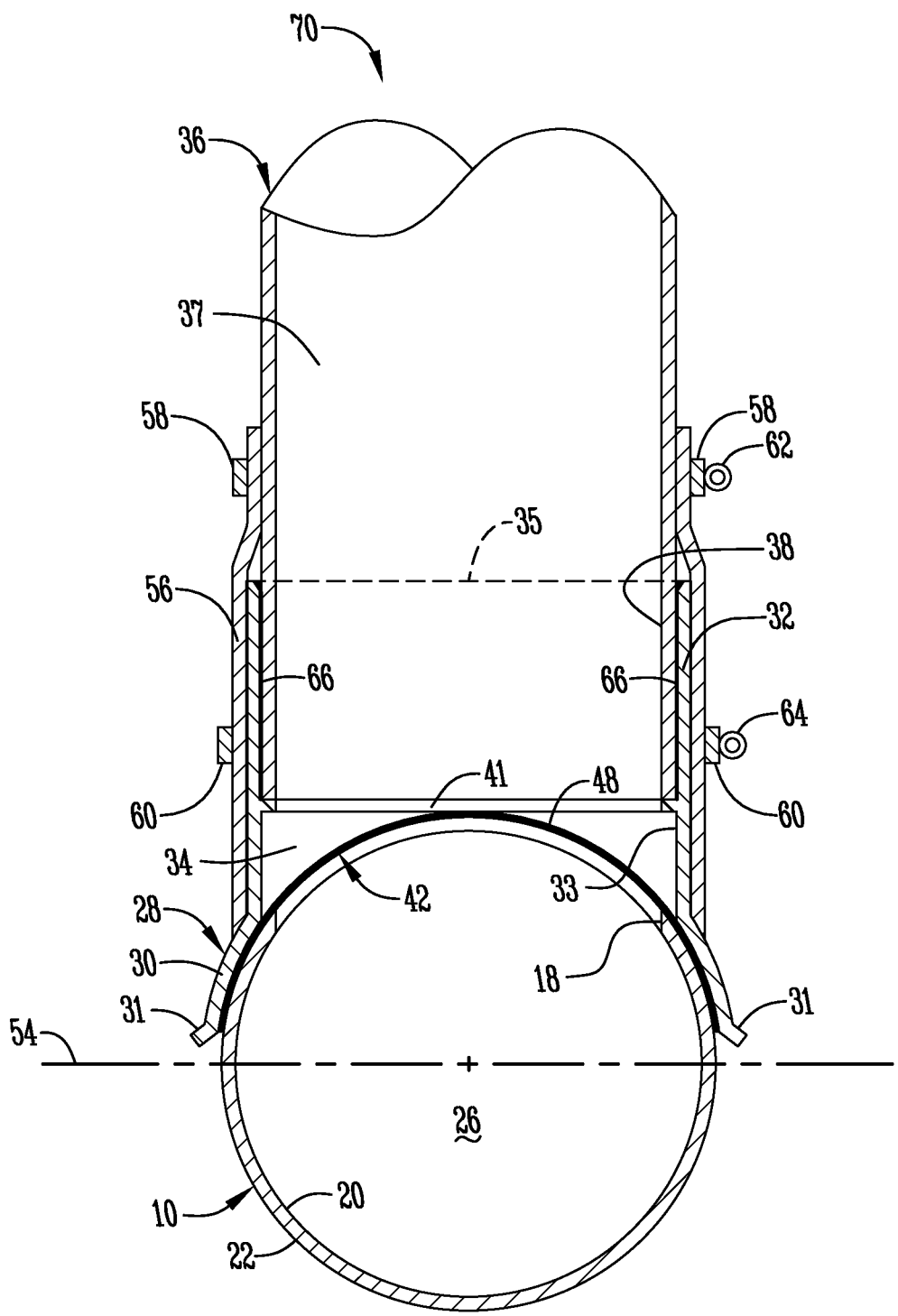
FIG. 3 is a sectional view taken along line 3-3 of FIG. 1.

As best shown in FIGS. 1-3, a pipe access device 28 includes a curved plate or saddle 30 and a boss 32. The boss 32 has a boss bore 34 extending there through. Boss bore 34 has a lower end 33 communicating with the sewer bore 26 through the aperture 18 and extending upwardly to an upper end 35. The curved plate 30 has a flange 31 at its outer tips, and extends along an arc associated with a central angle of less than 180°.

Although the pipe 10 is discussed in the context of having a circular shape, it is to be understood that the pipe 10 need only have a substantially circular cross-section and not necessarily a perfectly circular cross-section. The curved plate 30 having a concave surface 39 is operably connected to the outer surface 22 of the pipe 10 along an arc of the outer surface of the pipe. That arc defines a corresponding central angle of the pipe 10 that is less than or equal to 180°. Put another way, the concave surface 39 of the curved plate 30 spans an arc length of the outer surface 22 of the pipe 10 that is less than half of the circumference of the outer surface of the pipe. The concave surface 39 in its initial state has a radius of curvature less than a radius of curvature of the outer surface 22 of the pipe 10. As such, the curved plate 30 is biased against the outer surface of the pipe 10 when the curved plate 30 it is expanded or flexed to engage the pipe 10, as shown in FIG. 3. When the access pipe 28 is secured to the pipe 10, the curved plate 30 is flexed such that the concave surface 39 follows a radius of curvature substantially equal to the radius or curvature of the outer surface 22 of the pipe 10.

An extension pipe 36 has an extension pipe bore 37 extending there through. The extension pipe 36 has a first end 38 telescoped with respect to upper end 35 of boss bore 34. The first end 38 rests on an annular flange 41 protruding inwardly from the boss bore 34 at approximately a tangent to sewer pipe 10, although it could be higher or lower.

Figure 4:
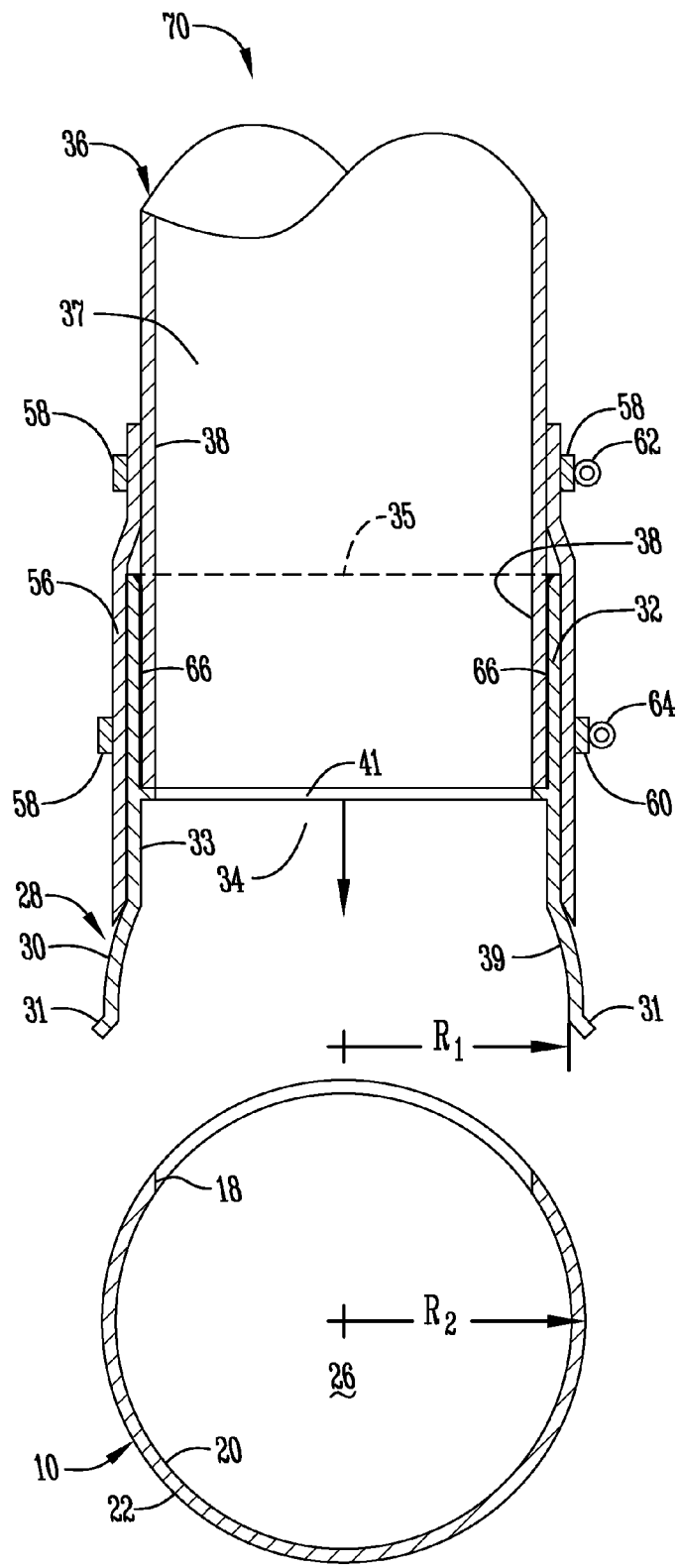
FIG. 4 is an exploded view similar to FIG. 3.

As illustrated in FIG. 3, a fluid resistant seal 42 is made between the curved plate 30 and the sewer pipe 10 by an adhesive 48. This fluid resistant seal 42 provides a fluid tight seal between the curved plate 30 and the outer surface 22 of sewer pipe 10. The radius $R_1$ of curvature 44 of the curved plate 30 is somewhat less than the radius of curvature $R_2$ of the outer surface 22 of the sewer pipe 10 (see FIG. 4). In addition, the longitudinal centerline 54 (FIG. 3) or spring line of the sewer pipe 10 is below the flanges 31 of the curved plate 30. The material of curved plate 30 is flexible and resilient so that it can be expanded to the radius of curvature $R_2$ of the outer surface 22 of the sewer pipe 10 when the curved plate is expanded or flexed to cover the pipe 10. Forming the curved plate 30 and 32 from PVC is suitable for the present invention.

Figure 5:
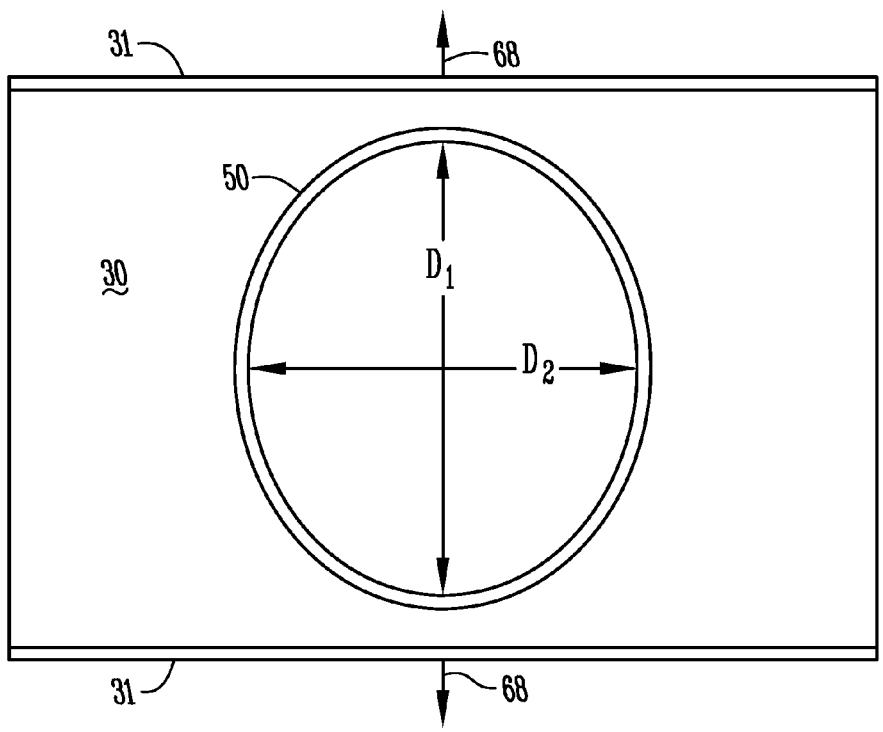
FIG. 5 is a top view of the pipe access device showing the oval-shape of the boss before expansion to engage the sewer pipe.
Figure 6:
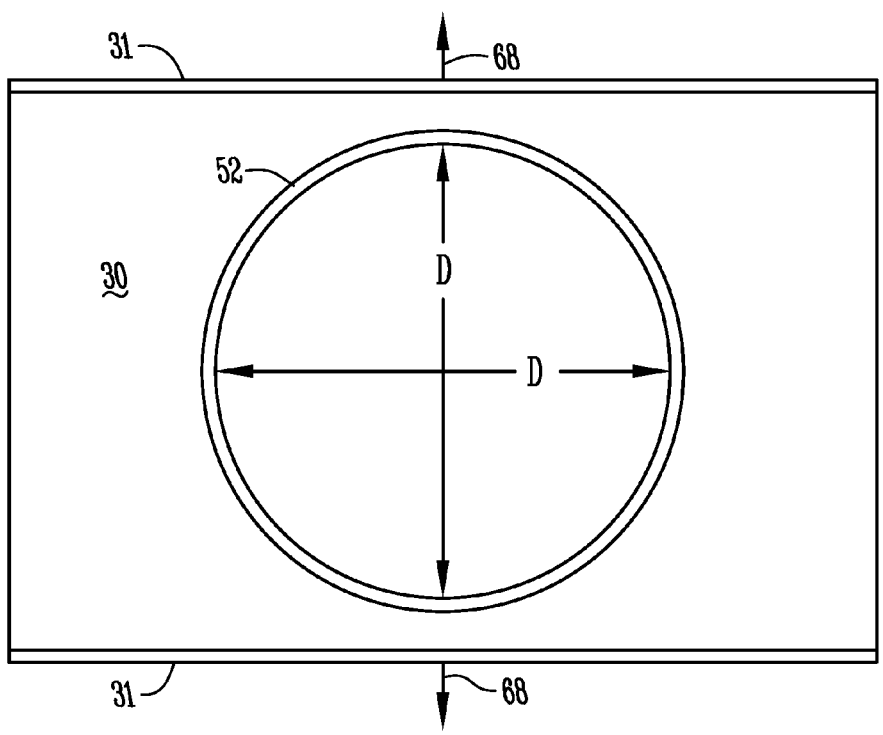
FIG. 6 is a top view of the pipe access device showing the circular shape of the boss after expansion of the curved plate to engage the sewer pipe.

Referring to FIGS. 5 and 6, the shape of the boss 32 changes from an oval-shape 50 to a substantially circular shape 52 when the curved plate 30 expands in the direction of arrows 68 to engage sewer plate 10. The oval-shape 50 is somewhat exaggerated for illustration purposes. As the curved plate 30 expands from FIG. 5 to FIG. 6, the boss deforms to produce the circle 52. This is important to allow the insertion of the extension pipe 36 into the upper end 35 of boss bore 34 and provide a fluid tight seal therebetween. This change in the shape of the boss 32 from an oval-shape 50 to a circular shape 52 is reflected by a major diameter $D_1$ and a minor diameter $D_2$ of the ovular shape 50 changing to a diameter D of a circle 52.

A flexible sleeve 56 (FIGS. 3 and 4) is provided outside of the first end 38 of extension pipe 36 and the upper end 35 of boss bore 34. The sleeve 56 includes two bands 58,60 which surround and engage the flexible sleeve 56 and are secured by screws 62,64 to create a fluid type seal. While the flexible sleeve 56 is shown, the pipe could be attached by an adhesive or other material conventionally used by plumbers in connecting plastic pipe together.

In operation, the excavated hole 24 is dug down to the sewer pipe 10 buried beneath the surface of the ground 14. This can all be done above ground remotely from the location of the sewer pipe 10 and does not require the installer to enter the excavated hole 24. The preferred method is to use a vacuum excavator manufactured by Vactor Manufacturing under the trade name VACTOR®, at the address of 1721 South Illinois Street, Streator, Ill. 61364. This device excavates a hole and removes the soil from the hole with a minimum of disturbance of the soil. The diameter D3 of the hole need be only large enough to permit the insertion of the curved plate 30 into the hole, and need be only deep enough to expose a portion of the outer surface of sewer pipe 10.

An assembly 70 includes the extension pipe 36, the saddle or curved plate 30 and the boss bore 34. The assembly 70 also includes the flexible sleeve 56, adhesive or other material. Before curved plate 30 engages the sewer pipe 10, the adhesive 66 is applied so that a fluid type seal 42 is provided by adhesive 66 between curved plate 30 and the outer surface 22 of sewer pipe 10. The sealing material may be an uncured plastic resin or it can be a physical sealing means such as gaskets or double side tape. All this is assembled above the excavated hole 24 before lowering within the excavated hole 24. Once the assembly is lowered into the excavated hole 24, the operator pushes on the extension pipe 36 to cause the curved plate 30 to expand and to surround the outer surface 22 of the sewer pipe 10 less than 180°. At this time the fluid tight seal is provided between the telescoped upper end 35 of the boss bore 34 and the first end 38 of the extension pipe 36.

Next an aperture 26 is cut within the sewer pipe 10. The preferred machine for making the aperture is a cutting machine manufactured by Milwaukee Tools under the trade name Diamond Coring Bits, sold in the Grainger Catalog at the address of 2701 Downers Grove, Ill. 60515.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. An apparatus for providing access to an interior bore of a pipe located below a surface of the ground, the pipe having an outer surface and a substantially circular cross section, the apparatus comprising:
   a curved plate adapted to engage the pipe along an arc of the outer surface of the pipe, the arc defining a corresponding central angle of the pipe less than or equal to 180°; and
   a boss having a boss bore, the boss extending upwardly from the curved plate about an aperture in the curved plate;
   wherein the curved plate having a concave surface with a radius of curvature less than a radius of curvature of the outer surface of the pipe so that the curved plate is biased against the outer surface of the pipe when the curved plate is expanded to engage the pipe.

2. The apparatus of claim 1 wherein the boss having an oval-shaped cross section that changes to a substantially circular cross section when the curved plate is expanded to engage the pipe.

3. The apparatus of claim 1 further comprising an extension pipe extending upwardly from the boss to near the surface of the ground.

4. The apparatus of claim 3 wherein the extension pipe is telescopically mounted to the boss.

5. The apparatus of claim 1 further comprising an adhesive material disposed between the surface of the curved plate and the outer surface of the pipe.

6. The apparatus of claim 1 wherein the arc of the outer surface of the pipe defines a corresponding central angle of the pipe less than 180°.

7. The apparatus of claim 1 wherein the pipe is a sewer pipe.

8. The apparatus of claim 7 wherein the sewer pipe is a lateral sewer pipe.

9. The apparatus of claim 1 wherein the boss having a substantially circular cross section that changes to an oval-shaped cross section when the curved plate is expanded to engage the pipe.

10. An apparatus for providing access to an interior bore of a pipe located below a surface of the ground, the sewer pipe having an outer surface and a substantially circular cross section, the apparatus comprising:
    a curved plate adapted to engage the pipe along an arc of the outer surface of the pipe, the arc having a length equal to or less than half the circumference of the outer surface of the pipe, and
    a boss having a boss bore, the boss extending upwardly from the curved plate about an aperture in the curved plate;
    wherein the curved plate being movable between a first position with the curved plate having a radius of curvature less than a radius of curvature of the outer surface of the pipe to a second position with the curved plate having a radius of curvature substantially equal to the radius of curvature of the outer surface of the pipe.

11. The apparatus of claim 10 wherein the boss having an oval-shaped cross section in the first position that changes to a substantially circular cross section when the curved plate is expanded to engage the pipe in the second position.

12. The apparatus of claim 10 further comprising an extension pipe extending upwardly from the boss to near the surface of the ground.

13. The apparatus of claim 12 wherein the extension pipe is telescopically mounted to the boss.

14. The apparatus of claim 10 further comprising an adhesive material disposed between the curved plate and the outer surface of the pipe.

15. The apparatus of claim 10 wherein the arc of the outer surface of the pipe having a less than half the circumference of the outer surface of the pipe.

16. The apparatus of claim 10 wherein the pipe is a sewer pipe.

17. The apparatus of claim 10 wherein the boss having a substantially circular cross section in the first position that changes to an oval-shaped cross section when the curved plate is expanded to engage the pipe in the second position.

18. An apparatus for providing access to an interior bore of a pipe located below a surface of the ground, the pipe having an outer surface and a substantially circular cross section, the apparatus comprising:
    a curved plate adapted to engage the pipe along an arc of the outer surface of the pipe, the arc defining a corresponding central angle of the pipe less than or equal to 180°; and
    a boss having a boss bore, the boss extending upwardly from the curved plate about an aperture in the curved plate, the boss having an oval-shaped cross section that changes to a substantially circular cross section when the curved plate is expanded to engage the pipe;
    wherein the curved plate having a concave surface with a radius of curvature less than a radius of curvature of the outer surface of the pipe so that the curved plate is biased against the outer surface of the pipe when the curved plate is expanded to engage the pipe.

19. A method of providing access to an interior bore of a pipe buried beneath a surface of the ground, the pipe having an outer surface and a substantially circular cross section, the method comprising:
    excavating the ground to expose a portion of the pipe;
    taking a pipe access device including a curved plate having a concave surface with a radius of curvature less than a radius of curvature of the outer surface of the pipe and being adapted to engage the pipe along an arc of the outer surface of the pipe, the arc defining a corresponding central angle of the pipe less than or equal to 180°, and a boss having a boss bore, the boss extending upwardly from the curved plate about an aperture in the curved plate;
    attaching the pipe access device to the pipe with the concave surface of the curved plate in facing relation over the arc of the outer surface of the pipe;
    cutting an access hole in the pipe aligned with the boss bore and providing fluid communication between the interior bore of the pipe and the boss bore of the pipe access device; and
    mounting an extension pipe to the boss of the pipe access device, the extension pipe extending upwardly from the boss to near the surface of the ground;
    wherein the attaching step includes pressing the curved plate downwardly onto the pipe so that the curved plate is biased against the outer surface of the pipe when the curved plate is expanded to engage the pipe.

20. The method of claim 19 wherein the extension pipe is mounted to the boss of the pipe access device before the pipe access device is attached to the pipe.

21. The method of claim 19 wherein the excavating step is performed using vacuum excavation.

22. The method of claim 19 further comprising:
applying an uncured and hardenable sealing material to the concave surface of the curved plate before attaching the pipe access device to the pipe; and
allowing the sealing material to cure and harden after attaching the pipe access device to the pipe.

23. The method of claim 19 wherein the boss having an oval-shaped cross section that changes to a substantially circular cross section when the curved plate is expanded to attach the pipe access device to the sewer pipe.

24. The method of claim 19 wherein the pipe is a sewer pipe.

* * * * *